(12) United States Patent
Wakui et al.

(10) Patent No.: US 6,396,225 B1
(45) Date of Patent: May 28, 2002

(54) DC CURRENT BRUSHLESS MOTOR DRIVING APPARATUS AND AIR CONDITIONER WITH USING THEREOF

(75) Inventors: Toyomitsu Wakui, Mibu; Kouji Katou; Atsushi Okuyama, both of Oohira; Hideki Terauchi, Kuzuu; Minoru Makita, Tochigi; Kisasu Kaneko, Kanuma; Masayuki Iwasaki, Oohira; Kenji Tamura, Tanuma, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/557,219

(22) Filed: Apr. 25, 2000

(30) Foreign Application Priority Data

Apr. 27, 1999 (JP) ............................................ 11-120449

(51) Int. Cl.[7] .............................................. H02K 23/00
(52) U.S. Cl. ........................ 318/254; 318/138; 318/439
(58) Field of Search ................................ 318/131–134, 318/138, 254, 439

(56) References Cited

U.S. PATENT DOCUMENTS 5,486,743 A * 1/1996 Nagai ........................... 318/254

FOREIGN PATENT DOCUMENTS

| JP | 52-144727 | 2/1977 |
| JP | 59-36519 | 9/1984 |
| JP | 2000-014187 | 1/2000 |

* cited by examiner

Primary Examiner—Marlon T. Fletcher
(74) Attorney, Agent, or Firm—Antonelli, Terry, Stout & Kraus, LLP

(57) ABSTRACT

For detecting commutation timing of an inverter when operating a DC brushless motor under a starting thereof or a light load condition, with certainty, a micro-computer generates driving signals so as to drive switching elements of the inverter by PWM signals of those driving signals, in a predetermined order by every turn-on interval, thereby supplying driving current to the DC brushless motor, wherein a timing for exchange between the turn-on intervals (i.e., the commutation timing) is detected by detection of level of magnetic pole position detecting signals upon a basis of the PWM signals. Here, the minimum ON time of the PWM signals is set at a time being detectable in the level of the magnetic pole position detecting signals, however the frequency of the PWM signals is lowered when the DC brushless motor is operated in starting or under a light load condition, so as to make duty ratio of the PWM signals fit to the operation in the starting or under the light load condition, thereby enabling to ensure the minimum ON time of the PWM signals.

4 Claims, 6 Drawing Sheets

DC CURRENT BRUSHLESS MOTOR DRIVING APPARATUS AND AIR CONDITIONER WITH USING THEREOF

BACKGROUND OF THE INVENTION

1. Field of the Invention

The present invention relates to a DC current brushless motor driver apparatus using an inverter therein, and in particular, it relates to a DC current brushless motor driver apparatus and an air driven thereby, wherein a relative position (hereinafter, being called by "magnetic pole position") between armature windings (stator windings) and stator windings is detected by a velocity or speed electromotive force which is induced across the stator windings, so as to control a revolution number thereof.

2. Description of Prior Art

As a conventional example of a DC brushless motor driving apparatus is described, for example in Japanese Patent Publication No. Sho 59-36519 (1984), wherein control of a revolution number thereof is conducted by detecting magnetic pole positions of a rotor, i.e., the relative positions between the magnetic rotor (herein after, being called only by a "rotor") and stator windings due to the velocity electromotive force (induction voltages) which is induced across the stator windings of the DC brushless motor.

In this, converting the induction voltages of three phases generated across the stator windings into three triangle-like signals, each having a positional relationship of around 90° to each the induction voltage, those three triangle-like signals are conducted into resistors which are connected in a star-connection, so as to make comparisons between the voltage at a neutral point of the star-connection and those of the three triangle-like signals by comparators. And, a group of semiconductor switching elements, contracting an inverter therewith, are controlled corresponding to pulse signals obtained from those comparators, thereby rotating the DC brushless motor.

In the DC brushless motor according to this conventional art, the triangle-like signals, each having the phase difference of around 90° to the each terminal voltage across each of the stator windings, are obtained by passing the terminal voltages of the stator windings through primary filters, however in this instance, the transfer function of the primary filters must be set so that the phase difference of around 90° can be maintained within a predetermined range of a basic frequency of the induction voltages (being in relation with the revolution number of the motor). Also, when noises or the like, having frequencies being higher than the basic frequency of the induction voltages, cannot removed sufficiently therefrom by means of the primary filters, and then if it is impossible to obtain the triangle-like signal having smooth wave-form therewith, there are further added low pass filters so as to remove the high frequency signals, such as the noises or the like therefrom.

From the above pulse signals obtained in this manner, the relative position between the rotor and the stator windings are assumed or obtained, thereby it is possible to perform the control of rotation speed of the DC brushless motor depending upon a result of that assumption.

By the way, in the DC brushless motor driving apparatus according to the conventional technology mentioned above, the primary filters are used for the purpose of obtaining the triangle-like signals, each having a relationship in the phase of around 90° to each of the induction voltages. Each of those filters, however, has a frequency characteristic that, when the basic frequency of the induction voltage as an input signal becomes low, the phase difference from the triangle-like signal which is obtained by this filter comes to be large. For the purpose of driving the DC brushless motor under a stable condition with good efficiency, there is a necessity that the frequency characteristic must be set, so that the phase difference of around 90° is maintained within the predetermined range of the basic frequency of the induction voltages, however for example, in a case where the range of the basic frequency of the induction voltages is desirous to be extended or expanded (i.e., a variable range of revolution number of the DC brushless motor is desirous to be extended or expanded), there is a problem that it is impossible to maintain the phase difference between the induction voltage and the triangle-like signal at around 90°, depending upon the frequency characteristic of the filters.

Also, the terminal voltage of the DC brushless motor, as is shown in FIG. 2 of the Japanese Patent Publication No. Sho 59-36519 (1984), comes to be such that a spike wave-form is superposed upon a trapezoidal wave-form. And, the noises or the like, having the frequencies being higher than the basic frequencies of those spike wave-form and the induction voltage, cannot be removed sufficiently by means of the primary filters, and it is impossible to assume or obtain the relative position between the rotor and the stator windings with accuracy, if the triangle-like signal is not smooth in the wave-form thereof, then the low pass filter is added further more, at an output stage of the above-mentioned comparator for comparing the triangle-like signal and a reference signal, thereby to remove the high frequency signals, such as the noises or the like.

However, it is enough to make the time constant of the filter large for the purpose of smoothing the wave-form of the triangle-like signal, but it causes time delay in the signal, therefore there is an upper limit in setting of the time constant of the filters. By the way, in the DC brushless motor, the wave-form of the spike voltage is changed depending upon a load of the motor, but there is the upper limit in setting the time constant of the filters, then there is a problem that it is impossible to maintain the phase difference between the induction voltage and the triangle-like signal at 90°, since the phase of the triangle-like signal is fluctuated in an appearance thereof due to change in the wave-form of the triangle-like signal.

In this manner, when the filters are used for the purpose of assuming or obtaining the relative position between the rotor and the stator windings, the accuracy in assuming the relative relationship between the rotor and the stator windings is decreased down due to the limits in the frequency characteristic and in setting of the time constant of the filters, in particular when driving the DC brushless motor in a wide range of the revolution number, or when operating it under a load condition of wide range, therefore it is difficult to drive the DC brushless motor under the stable condition with good efficiency.

SUMMARY OF THE INVENTION

An object according to the present invention is, for dissolving such the problems mentioned in the above, to provide a DC brushless motor driving apparatus and an air conditioner driven thereby, being able to drive the DC brushless motor under stable condition with good efficiency, even in a case of driving the DC brushless motor in a wide range of the revolution number, or in a case of driving it under a wide range of the load condition.

Another object according to the present invention is, for dissolving such the problems mentioned in the above, to provide a DC brushless motor driving apparatus and an air conditioner driven thereby, being able to detect the commutation timings of a group of semiconductor switching elements of an inverter with certainty, when starting the DC brushless motor or operating it under a light load condition, thereby enabling a stable operation control thereof.

According to the present invention, for accomplishing the object mentioned above, in a DC brushless motor driving apparatus is provided a rotor magnetic pole position detecting circuit for generating magnetic pole position detecting signals for respective phases, by comparing three-phase induction voltages generated across the stator windings to a DC power source voltage of the inverter, in which a plurality of semiconductor switching elements are constructed in a star-connection, or to a reference voltage of a predetermined voltage obtained from a neutral point of said stator windings, wherein a timing for changing over a turn-on interval is obtained by referring to the magnetic pole position detecting signals with respect to any one of the stator windings which is not turned-on, thereby rotating the rotor.

Also, according to the present invention, the driving portion does not refer to said magnetic pole position detecting signal during a time when flywheel current flows through the flywheel diode.

Further, according to the present invention, the levels of the magnetic pole position detecting signals obtained from the above rotor magnetic pole position detecting circuit are detected sequentially, thereby to obtain the timing for changing from a changing time point of the level to a next turn-on interval.

Further, according to the present invention, for accomplishing the object mentioned above, there is provided means for making a frequency of PWM signals of inverter driving signals variable, thereby enabling to make the frequency of the PWM signals different, between when starting or driving the DC brushless under a light load and when driving a normal stable condition.

Also, according to the present invention, such the means is so constructed that the frequency of the PWM signals is exchanged when an ON of the PWM signal comes to be equal to a predetermined time which is set in advance.

Further, according to the present invention, the means mentioned above is so constructed that, detecting a DC power source voltage of the inverter, the frequency of the PWM signals is exchanged depending upon a result of the detection.

DESCRIPTION OF PREFERRED EMBODIMENTS

Hereinafter, embodiments according to the present invention will be fully explained by referring to the attached drawings.

Figure 1:
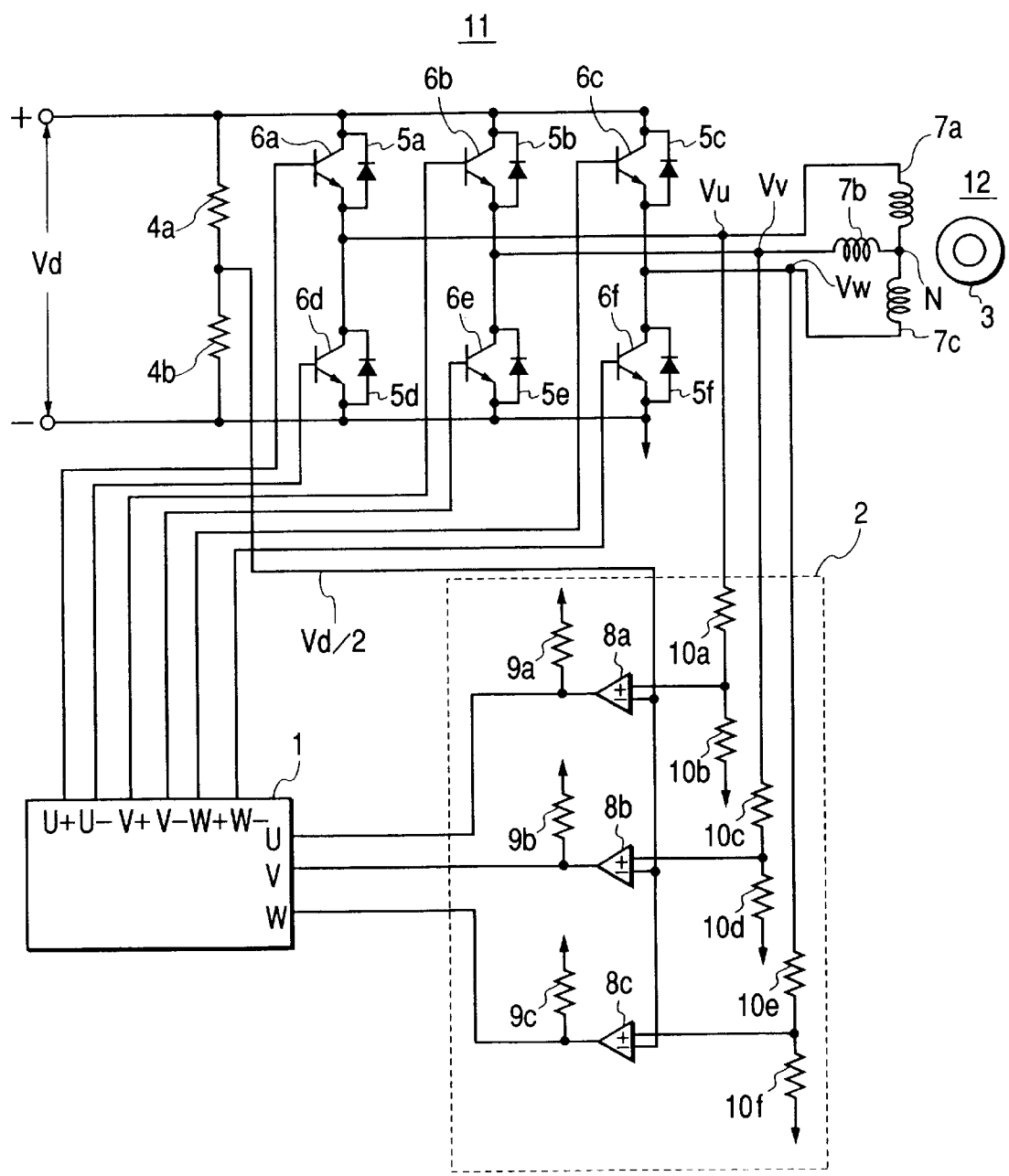
FIG. 1 is a circuit construction diagram for showing a first embodiment of a DC brushless motor driving apparatus and an air conditioner with using thereof, according to the preset invention.

FIG. 1 shows a circuit diagram of a first embodiment of a direct current (DC) brushless motor driver apparatus according to the present invention, wherein a reference numeral 1 indicates a micro-computer, 2a position detector circuit of rotor magnetic poles, 3a rotor, 4a and 4b detection resistors of a reference voltage, 5a–5f flywheel or return-current diodes, 6a–6f semiconductor switching elements, 7a–7c stator windings, 8a–8c comparators, 9a–9c pull-up resistors; 10a–10f detecting resistors of a motor terminal voltage, 11 an inverter, and 12 a DC brushless motor.

In the same figure, the inverter 11 is constructed with the semiconductor switching elements 6a–6f being in a bridge-connection and the flywheel diodes 5a–5f which are connected in parallel therewith, and to this inverter 11 is applied a DC power source voltage Vd. Also, the rotor 3 and the stator windings 7a–7c construct the DC brushless motor 12, and to each of the stator windings 7a–7c in the respective phases of the DC brushless motor 12 is supplied a driving current at a predetermined timing from the inverter 11 which is driven by driving signals U+, U−, V+, V−, and W+, W− from the micro-computer 1. Here, the driving signal U+ drives the semiconductor switching element 6a ON/OFF, and hereinafter, the driving signal U− drives the semiconductor switching element 6d into ON/OFF, the driving signal V+ drives the semiconductor switching element 6b ON/OFF, the driving signal V− the semiconductor switching element 6e ON/OFF, the driving signal W+ the semiconductor switching element 6c ON/OFF, and the driving signal W− the semiconductor switching element 6f ON/OFF, respectively.

The position detector circuit 2 of rotor magnetic poles is constructed with the comparators 8a–8c, the pull-up resistors 9a–9c and the detecting resistors 10a–10f for the motor terminal voltages Vu, Vv and Vw, and it detects the voltages Vu, Vv and Vw at the respective terminals of the DC brushless motor 12, thereby producing position detection signals U, V and W corresponding to them respectively, to be supplied to the micro-computer 1. In this rotor magnetic pole position detector circuit 2, the motor terminal voltage Vu generated at the terminal of the stator winding 7a is detected by the detecting resistors 10a and 10b and is supplied to the comparator 8a, the motor terminal voltage Vv generated at the terminal of the stator winding 7b is detected by the detector resistors 10c and 10d and is supplied to the comparator 8b, and the motor terminal voltage Vw generated at the terminal of the stator winding 7c is detected by the detector resistors 10e and 10f and is supplied to the comparator 8c. Also to those compartors 8a–8c are supplied a reference voltage Vd/2, that is a half (½) of the DC power voltage Vd, which is detected by the detecting resistors 4a and 4b, thereby being compared with the detected motor terminal voltages Vu, Vv and Vw, respectively.

The respective comparison results are obtained as the position detection signals U, V and W, each having a high or low level, by the pull-up resistors 9a, 9b and 9c which are connected to the output terminals of the comparators 8a–8c, thereby to be supplied to the micro-computer 1.

However, in an air conditioner, the DC brushless motor 12 functions as a driving motor of a compressor in a refrigerating cycle thereof, though not shown in the figure.

Figure 2A:
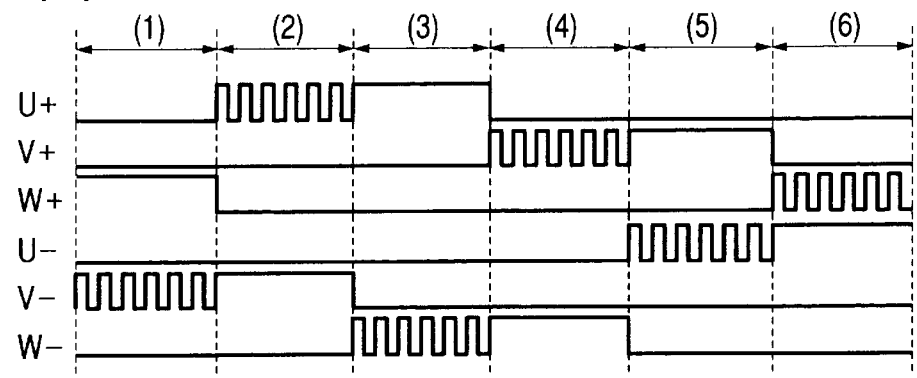
FIGS. 2(a) to (c) are timing charts for showing the signal or voltage at each part shown in the FIG. 1, in each turn-on interval.

The micro-computer 1 produces the driving signals U+, U−, V+, V−, and W+, W− for the inverter 11 from those position detection signals U, V and W, and the waveforms of those are shown in FIG. 2(a). In the FIG. 2, the turn-on or energized time periods or intervals of the DC brushless motor 12 are indicated by (1), (2), (3), (4), (5), (6) . . . . The semiconductor elements 6a–6c at a + power terminal side in the inverter 11 are collectivly called as an upper arm, while the semiconductor elements 6d–6f at a − power terminal as an lower arm, and here it is assumed that the chopping can be performed by the semiconductor elements of both the upper and lower arms, and that the chopping is performed in a time sequence, i.e., the semiconductor switches 6e, 6a, 6f, 6b, 6d and 6c, and this sequence is repeated. The switching element by which the chopping was performed is kept in the ON state during the next turn-on period, and further, after keeping the state of OFF for four (4) turn-on periods, it is driven to perform the chopping. Accordingly, the driving signals U+, U−, V+, V− and W+, W− are changed, as shown in the FIG. 2(a), with progress on the turn-on time period.

However, a duty ratio of this chopping (accordingly, the ON period in each cycle of the chopping of the driving signals U+, U−, V+, V− and W+, W−) is variable, and by controlling this duty ratio, the revolution number of the DC brushless motor 12 is controlled.

While the inverter 11 is driven in this manner, the turn-on phase of the DC brushless motor 12 is changed one by one. Here, the stator winding 7a is in the U phase, the stator winding 7b in the V phase, and the stator winding 7c in the W phase. In the example shown in the FIG. 2(a), for example in the turn-on period (1), the semiconductor switching elements 6c and 6e are driven by the driving signals W+ and V−, then the driving current flows through the stator windings 7c and 7b, therefore the turn-on phases of the DC brushless motor 12 are V and W. In the same manner, in the turn-on period (2), since the semiconductor switching elements 6a and 6e are driven by the driving signals U+ and V−, then the turn-on phases of the DC brushless motor 12 are U and V, . . . , and in the turn-on period (6), since the semiconductor switching elements 6a and 6e are driven by the W+ and U−, then the turn-on phases of the DC brushless motor 12 are W and U. After completing this in the turn-on period (6), it turns back to the turn-on period (1) again, and this is repeated thereafter.

Figure 2B:
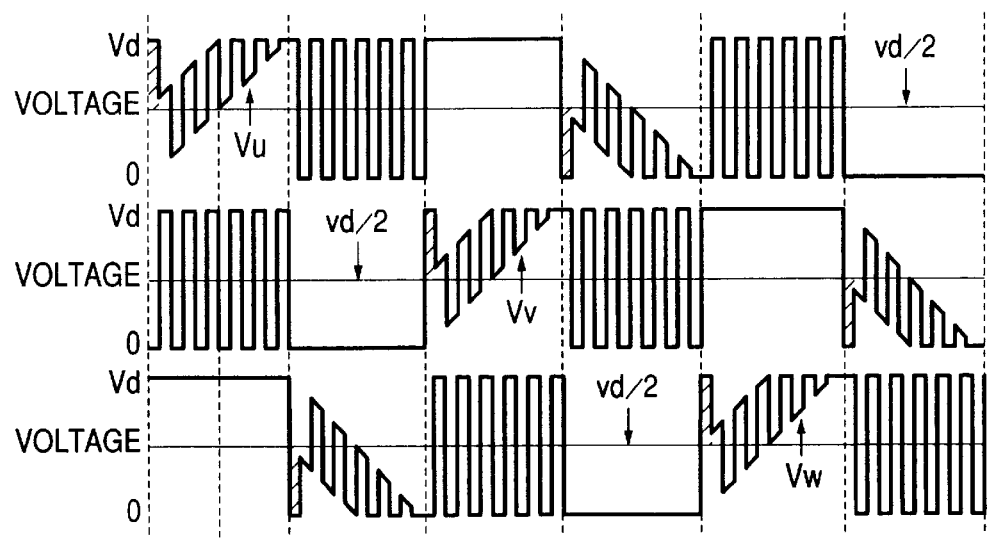

As is mentioned in the above, when the driving signals U+, U−, V+, V− and W+, W− are supplied to the semiconductor switching elements 6a, 6d, 6b, 6e, 6c and 6f, respectively, the terminal voltages at the respective phases of the motor are indicated by the voltages Vu, Vv and Vw, as indicated in FIG. 2(b).

Namely, in the turn-on period (1), the turn-on phases are the V and W phases, then the semiconductor switching element 6e performs the chopping by the driving signal V−, while the semiconductor element 6c is kept in the ON state by the driving signal W+ at a constant level, therefore the driving current flows from the semiconductor switching element 6c through the stator windings 7c and 7b into the semiconductor switching element 6e, however the semiconductor switching elements 6a and 6f are kept in the OFF state, then no driving current is supplied into the stator winding 7a. Thereby, the U phase is in non-turn-on (or non-energized) state, and the motor terminal voltage of this non-turn-on phase U, as shown in the FIG. 2(b), comes to be in such a form that, upon the induction voltage, increasing up gradually as the rotating rotor 3 comes close to the stator winding 7a, is superposed the voltage due to the driving current flowing through the stator windings 7c and 7b in an intermittent waveform.

On the contrary, since the semiconductor switching element 6c is kept in the ON state by the driving signal W+, the motor terminal voltage Vw in the phase W of the turn-on state, as shown in the FIG. 2(b), comes to be the voltage being equal to the DC power source voltage Vd, while since the semiconductor switching element 6e performs the chopping by the driving signal V−, the motor terminal voltage Vv in the phase V of the turn-on state, as shown in the FIG. 2(b), comes to be zero (0) when the semiconductor switching element 6e is in the ON state, and Vd when the semiconductor switching element 6e is in the OFF state, thereby coming to a pulse-like voltage being reverse to the driving signal V− in the phase and having the amplitude Vd.

Also, the motor terminal voltage Vu is the voltage at a point where the stator windings 7a–7c are connected to one another to the induction voltage of the stator winding 7a (i.e., a neutral point of the stator windings), i.e., the voltages of the value Vd/2 are superposed thereupon, therefore the intermittent waveform of this motor terminal voltage Vu comes to be in the same phase as the motor terminal voltage Vv, therefore it is reverse to the driving signal V− in the phase.

Figure 2C:
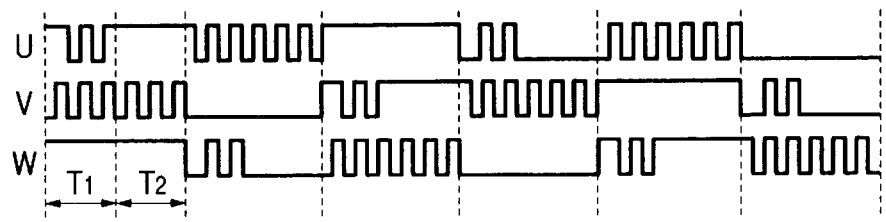

Those motor terminal voltages Vu, Vv and Vw are detected by the detecting resistors 10a and 10b, the detecting resistors 10c and 10d, and the detecting resistors 10e and 10f, respectively, and are compared with the reference voltage Vd/2 by the comparators 8a, 8b and 8c. From the comparators 8b, as shown in FIG. 2(c) can be obtained the magnetic pole position detecting signal V of the rotor 3, being intermittent at the same phase to the motor terminal voltage Vv, while from the comparator 8c, as shown in FIG. 2(c), can be obtained the magnetic pole position detecting signal W having a constant amplitude as same as the motor terminal voltage Vw. Also, the induction voltage of the motor terminal voltage Vu shown in the FIG. 2(b) rises up the value almost linearly from zero (0) to Vd, in the turn-on period (1). Because of this, if comparing this motor terminal voltage Vu with the reference voltage Vd/2 by the comparator 8a, there can be obtained the magnetic pole position detecting signal U, which is intermittent at the same phase as the motor terminal voltage Vu in the first half period T1 in this turn-on interval (1), while being kept at the constant amplitude being same to this intermittent wave in the second or latter half period T2.

In this manner, the magnetic pole position detecting signals U, V and W in the turn-on interval (1) are obtained, and within the micro-computer 1, the magnetic pole position of the rotor 3 is detected from those and one of the driving signals U+, U−, V+, V− and W+, W−, which is generated at that time and to be chopped, thereby detecting the timing for changing into the driving signals U+, U−, V+, V− and W+, W− in the next turn-on interval (2), however those will be explained by referring to FIG. 3. Here, in the FIG. 3, the timing relationships between the driving signals U+, U−, V+, V− and W+, W− and the magnetic pole position detecting signals U, V and W, within the turn-on intervals (1) and (2), are shown, with the time being extended.

In the same figure, when considering on the turn-on interval (1), a boundary between the period Tb and the period Tc is a middle point of the turn-on interval (1), therefore T1=Ta+Tb and T2=Tc. Also, the period Ta is a first one cycle of the driving signal V– in the period T1, and is a period where a spike voltage which will be mentioned later is generated.

As mentioned in the above, the relationship between the driving signal V– and the magnetic pole position detecting signal U is in reverse to each other in the period Tb, and in the period Tc, the magnetic pole position detection signal U is kept at the high level. Then, now assuming that the high level is indicated by "1" and the low level by "0", the level of the magnetic pole position detecting signal U at the timing of "1" of the driving signal V– is as follows:

"0" in the period Tb, "1" in the period Tc

Accordingly, when detecting the level of the magnetic pole position detecting signal U at the timing of "1" of the driving signal V– one by one, it is possible to consider that the time point when this detection level is turned from "0" to "1" is the time point when it is shifted from the period Tb to the period Tc. From this, it is clear that the middle point of the turn-on interval (1), i.e., the magnetic pole of the rotor reaches to a specific position with respect to, for example, the stator winding 7a. In this manner, it is possible to detect the relationship in relative positions between the rotor and the stator windings.

And, for example, counting up the number of pulses of the driving signal V– from a preset value (for example, zero (0)), from a starting time position of the turn-on interval (1), and initiating a count down when the level of the magnetic pole position detecting signal U is reversed from "1" to "1", from the number being counted up until that time point, it can be said that the time period Tc passes through when it is counted down to the original preset value, therefore that time point is set to be as an initial time point of the next turn-on interval.

In the manner mentioned above, it is possible to detect the time point for changing from the turn-on interval (1) to the turn-on interval (2), and the driving signals U+, U–, V+, V– and W+, W– are changed as shown in the FIG. 2(a).

The above was explanation given on the detection of the magnetic pole position of the rotor 3 in the turn-on interval (1), however next, expiation will be given on detection of the magnetic pole position of the rotor 3 in the turn-on interval (2).

In the turn-on interval (2), in the FIG. 1, as mentioned in the above, the turn-on phases are U and V, and as shown in the FIG. 2(a), the semiconductor switching element 6a performs the chopping by the driving signal U+ while the semiconductor switching element 6e is kept in the ON state by the driving signal V–, and the remaining semiconductor switching elements 6b, 6c, 6d and 6f are kept in the OFF state. Therefore, in the DC brushless motor 12, the driving current to be chopped flows from the semiconductor switching element 6a through the stator windings 7a and 7b to the semiconductor switching element 6e, thereby generating the induction voltage across the stator winding 7c.

In this instance, the motor terminal voltage Vu in the U phase of the DC brushless motor 12, as shown in the FIG. 2(b), is the pulse voltage, being same to the driving signal U+ in the phase and having the amplitude of Vd, while the motor terminal voltage Vv in the V phase of the DC brushless motor 12, since the semiconductor switching element 6e is kept in the ON state, as shown in the FIG. 2(b), is kept to be zero (0). On the contrary, with respect to the stator winding 7c is shifted the magnetic pole of the rotor 3 to be far therefrom, the induction voltage generated across the stator winding 7c decreases down linearly from the value of about Vd/2, therefore the motor terminal voltage Vw, as shown in the FIG. 2(b), comes to be the voltage superposing upon this the voltage at the neutral point N of the stator windings 7a and 7b, i.e., the pulse voltage having the amplitude Vd/2 and being synchronized with the motor terminal voltage Vu in the phase thereof.

Then, when the motor terminal voltages Vu, Vv and Vw are supplied to the rotor magnetic pole position detecting circuit 2, those are compared with the reference voltage of Vd/2 by the comparators 8a, 8b and 8c, respectively, thereby as shown in the FIG. 2(c), obtaining the pulse-like magnetic pole position detecting signal U being synchronized with the driving signal U+ in the phase, the magnetic pole position detecting signal V at the level "0", and the magnetic pole position detecting signal W which is in the pulse-like waveform and synchronized with the driving signal U+ in the phase, in the first half period T1 of the turn-on interval (2) and is at the level "0" in the second half period T2. Those are supplied to the micro-computer 1.

Next, by referring to the FIG. 3, explanation will be given on the magnetic pole position detection of the rotor 3 from those magnetic pole position detecting signals U, V and W in the turn-on interval (2).

In the same figure, also within the turn-on interval (2), there is the first half period T1 having a period Ta and a period Tb, and the second half period T2 is indicated by a period Tc. This period Ta, being same in the case of the previous turn-on interval (1), indicates the period of the first one cycle of the driving signal U+ in the turn-on interval (2) where the spike voltage is generated.

Here, considering on the relationship between the driving signal U+ and the magnetic pole position detecting signal W, in the period Tb, the magnetic pole position detecting signal W is also "1" when the driving signal U+ is "1", and in the period Tc, the magnetic pole position detecting signal W is "0" when the driving signal U+ is "1". Accordingly, detecting the level of the magnetic pole position detecting signal W at every time point when the driving signal U+ is at "1", it is becomes clear that it comes to the middle point of the turn-on interval, i.e., the magnetic pole of the rotor 3 reaches to a specific position, for example, with respect to the stator winding 7a, when this level is turned over from "1" to "0". In this manner, it is possible to detect the relative position relationship between the rotor and the stator windings.

Then, for example, counting up the pulse number of the driving signal U+ from the starting time point of the turn-on interval (2), it is changed to be counted down when the detection level of the above is turned over from "1" to "0", and then it is possible to set the time point when that count value comes back to the original preset value, as the time point for changing from the turn-on interval (2) into the turn-on interval (3).

Hereinafter, also utilizing the turn-on intervals (3), (4), (5) and (6) and the induction voltages across the non-energized stator winding(s) of the non-turn-on phases, it is possible to detect the position of the magnetic poles of the rotor 3, thereby detecting the time point for changing over the turn-on interval. And the turn-on intervals (1)–(8) are repeated.

In this case, as is apparent from the FIGS. 2(a) and (c), it is possible to detect the middle points of the turn-on intervals, in particular, in the turn-on interval (3) is reversed the detection level of the magnetic pole position detecting signal V from "0" to "1", in the turn-on interval (4) the detection level of the magnetic pole position detecting signal U from "1" to "1", in the turn-on interval (5) the detection level of the magnetic pole position detecting signal W from "0" to "1", and in the turn-on interval (6) the detection level of the magnetic pole position detecting signal V from "1" to "0", etc.

In the magnetic pole detection method mentioned above, the magnetic pole position detecting signals U, V and W, including the induction voltages, in every other turn-on intervals (1), (3) and (5), and the driving signals V−, W− and U− for chopping are same in the relationship of the waveforms thereof, and the time point for changing into the next turn-on interval is determined at the time point when the detection level of the magnetic pole position detecting signal due to such the driving signal is changed from "0" to "1" (i.e., being in the same pattern changing from "0" to "1") in every case, while the magnetic pole position detecting signals U, V and W, including the induction voltages, in the other every other turn-on intervals (2), (4) and (6), and the driving signals U+, V+ and W+ for chopping are same in the relationship of the waveforms thereof, and the time point for changing into the next turn-on interval is determined at the time point when the detection level of the magnetic pole position detecting signal due to such the driving signal is changed from "1" to "0" (i.e., being the same pattern changing from "1" to "0") in every case.

On the contrary to this, by using all of the magnetic pole position detecting signals U, V and W, the patterns are made different for each of the six (6) turn-on intervals (1) to (6), thereby it is possible to determine which one be the next turn-on interval among the turn-on intervals (1)–(6), uniquely.

Figure 3:
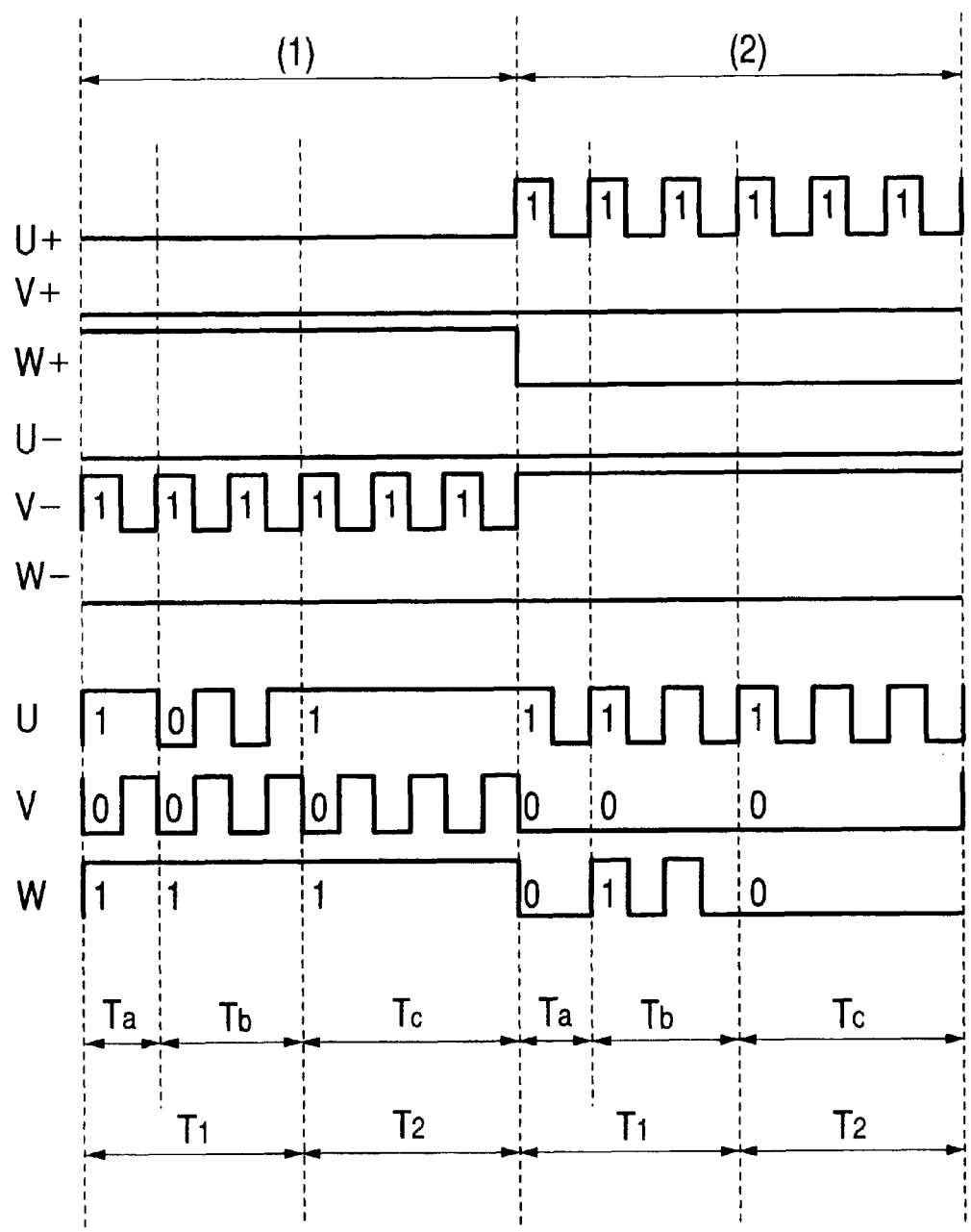
FIG. 3 shows a relationship in timing between the driving signal of the inverter and the magnetic pole position detecting signal in the turn-on intervals (1) and (2) shown in the FIGS. 2(a) to (c)

Namely, in the FIG. 3, assuming that it is now in the turn-on interval (1), the magnetic pole position detecting signal U is "0" at the time point when the driving signal V− is "1" in the period Tb, while the magnetic pole position detecting signal V is "0" and the magnetic pole position detecting signal W is "1". Here, assuming that a pattern consisting of the levels of the magnetic pole position detecting signals U, V and W at the time point when the driving signal V− is at "1" is (U,V,W), then that patter in this instance is (0,0,1). The pattern in the period Tc of the turn-on interval (1) is, in the same manner, (1,0,1) from the FIG. 3. Accordingly, by detecting the change from the (0,0,1) to (1,0,1), it is possible to detect the time point for changing into the next turn-on interval.

Hereinafter also in the same manner, the changes in the pattern in the turn-on intervals (1)–(6) are as shown in a Table 1 below.

TABLE 1

| Turn-On Interval | Pattern Change |
|---|---|
| (1) | (0,0,1) → (1,0,1) |
| (2) | (1,0,1) → (1,0,0) |
| (3) | (1,0,0) → (1,1,0) |
| (4) | (1,1,0) → (0,1,0) |
| (5) | (0,1,0) → (0,1,1) |
| (6) | (0,1,1) → (0,0,1) |

In the FIG. 1, within the micro-computer 1 is stored an information indicating the above patterns and the order of the changes, being inherent to the turn-on intervals (1)–(6) respectively, and it detects the levels of the magnetic pole position detecting signals U, V and W which are supplied from the rotor magnetic pole position detecting circuit 2 in the manner mentioned above, thereby ensuring in which one of them lies the turn-on interval at present, as well as to determining which one be the next turn-on interval. When detecting the changes in patterns mentioned above, the interval is changed into the next turn-on interval, which is determined at the time point mentioned above, measured from this time point.

In this manner, by utilizing the pattern (U,V,W) of the detection levels of the magnetic pole position detecting signals U, V and W of three phases in each of the turn-on intervals, it is superior in noise durability thereof, comparing to the case of using the detection level of the one phase among the magnetic pole position detecting signals U, V and W in each of the turn-on intervals, which was explained previously.

However, in the example mentioned above, the turn-on intervals can be made T1=T2 in the FIGS. 2 and 3, however not being restricted only to this, it also may be possible that T2=αT1 (however, 0<α<1). Namely, by making T2<T1, the timing of change into the next turn-on interval is advanced earlier than that in the case which was explained in the above, and with doing so, there may be a case where an efficiency of the motor can be increased up.

By the way, for the purpose of conducting such the accurate detection of the magnetic pole positions as mentioned above, it is necessary, in the FIG. 1, to take an effect of the flywheel or return current flowing through the inverter 11 into the consideration. In a predetermined time period just after the change, when changing into the next turn-on interval, the flywheel current flows in any one of the flywheel diodes 5a–5f, and the diodes through which the flywheel current flows are turned into the conductive state.

And, in a case when the flywheel current flows through the flywheel diodes 5a, 5b and 5c of the upper arm, the spike voltage having an amplitude almost equal to the DC power source voltage Vd appears as the motor terminal voltages Vu, Vv and VW in the route of flow of the flywheel current. In the FIG. 2(b), those spike voltages are indicated as the portion at the voltage Vd on the motor terminal voltage Vu in a starting portion of the turn-on interval (1), on which is treated hatching, as the portion at the voltage Vd on the motor terminal voltage Vv in a starting portion of the turn-on interval (3), on which is treated hatching, and as the portion at the voltage Vd on the motor terminal voltage Vw in a starting portion of the turn-on interval (5), on which is treated hatching, respectively. Also, in a case when the flywheel current flows through the flywheel diodes 5d, 5e and 5f of the lower arm, the spike voltage having an amplitude almost equal to zero (0) appears as the motor terminal voltages Vu, Vv and VW in the route of flow of the flywheel current. In the FIG. 2(b), those spike voltages are indicated as the portion at the voltage 0 on the motor terminal voltage Vu in a starting portion of the turn-on interval (2), on which is treated hatching, as the portion at the voltage 0 on the motor terminal voltage Vv in a starting portion of the turn-on interval (4), on which is treated hatching, and as the portion at the voltage Vd on the motor terminal voltage Vw in a starting portion of the turn-on interval (6), on which is treated hatching, respectively.

However, in the FIG. 3, that the first half portion in the period Ta on the magnetic pole position detecting signal U is "1", in the turn-on interval (1), is due to the spike voltage occurring on the motor terminal voltage Vu in the turn-on interval (1) shown in the FIG. 2(b), and that the second or latter half portion in the period Ta on the magnetic pole position detecting signal W is "0", in the turn-on interval (2), is due to the spike voltage occurring on the motor terminal voltage Vw in the turn-on interval (2) shown in the FIG. 2(b)

With such the spike voltages on the magnetic pole position detecting signals U, V and W, as is apparent from the FIG. 3, the level in the first half period Ta within the turn-on interval is made to be same to the level in the second half period Tc in the same turn-on interval. Therefore, in each the turn-on interval, when trying to determine the timing to change into the next turn-on interval by detecting the level of the magnetic pole position detecting signal in the period Tc, this level appears at first in the turn-on interval due to that spike voltage, therefore the starting time point of this turn-on interval which is changed over is decided to be as the detecting position of the magnetic poles, erroneously. As a result of this, the time point to change into the next turn-on interval is decided from this time point, therefore decreasing down an accuracy in detection of the position of the magnetic poles. This is also true, as was mentioned in the above, in a method for detecting the same magnetic pole positions by using the pattern (U,V,W) of the detection levels of the three (3) magnetic pole position detecting signals U, V and W, and for example, as is indicated in the FIG. 3, the pattern in the period Ta comes to be equal to the pattern in the period Tc, in each of the turn-on intervals. Accordingly, also in this case, when trying to detect the time point when the pattern is to be changed in the period Tc, the starting time point of the turn-on interval is erroneously decided to be that time point.

Therefore, for enabling to detect the level of the magnetic pole position detecting signal without an ill influence of the spike voltages, it is so arranged that the level of the magnetic pole position detecting signals cannot be detected in the first cycle of the driving signal.

The above was the basic operation of the first embodiment.

Figure 4A:
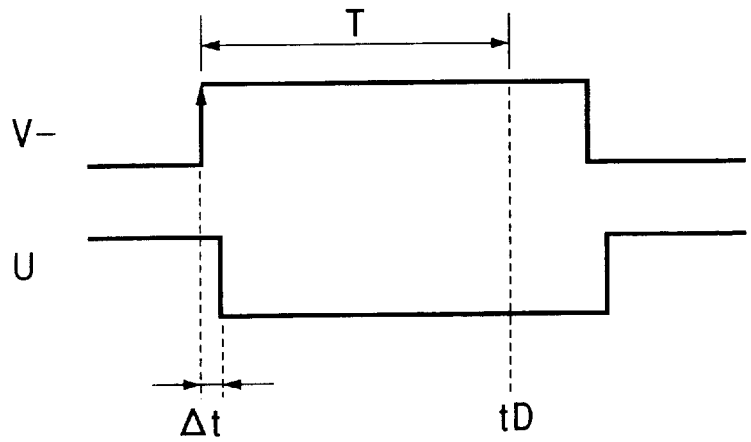
FIGS. 4(a) and (b) are views for explaining the minimum ON time of the PWM signal of the driving signal for the inverter, which is produced in a micro-computer.

However, the micro-computer 1 needs a predetermined time period, from the time when outputting the driving signals for the inverter 11 until the time when being able to detect the levels of the output pulse signals from the comparators of the rotor magnetic pole position detecting circuit. For example, explaining on the example of the turn-on interval (1) shown in the FIG. 3, the micro-computer 1, as shown in FIG. 4(a), detects the level of the magnetic pole position detecting signal U which is outputted from the comparator 8a upon the basis of a rise-up edge of this pulse when outputting one pulse of the driving signal V−, however the detection timing $t_D$ of this level is delayed by a predetrmined time T from the rise-up edge of the pulse of the driving signal V−. Such the time T is, for example, around 13 $\mu$sec (hereinafter, T=13 $\mu$sec). Further, $\Delta$T means a transmission delay of the magnetic pole position detecting signal U.

Figure 4B:
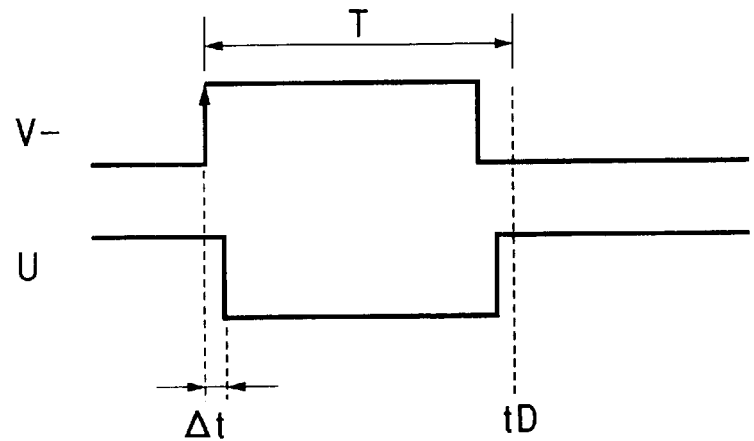

By the way, a duty ratio when chopping by the driving signals U+, U−, V+, V− and W+, W− (accordingly, the ON time when chopping) is variable (accordingly, they are PWM (Pulse Width Modulation) signals when chopping by the driving signals U+, U−, V+, V− and W+, W−, therefore those signals when chopping are called by the PWM signals, hereinafter), and by changing it, it is possible to perform the control on revolution number of the DC brushless motor 12, wherein the smaller the revolution number, the smaller the duty ratio, i.e., the ON time when chopping (namely, of the PWM signal) comes to be short. And, when the pulse width of the PWM signal of the driving signal V− is shorter than the time T from the rise-up edge of the mentioned above until the timing $t_D$ of the level detection, the pulse width of the magnetic pole position detecting signal U also comes to be equal to the pulse width of this PWM signal, i.e., a short one, therefore, as shown in FIG. 4(b), it is impossible to detect the level of the magnetic pole position detecting signal U, with an accuracy.

For prevention from this, the pulse widths of the PWM signals of the driving signals U+, U−, V+, V− and W+, W− should be greater than the T=13 $\mu$sec.

However, if a lower limit is provided on the ON time of the PWM signal, it is impossible to set the duty ratio of the PWM signal corresponding to this, in a case when the DC brushless motor 12 rotates at a low revolution number, such as in a starting operation thereof or in an operating under a light load.

According to the first embodiment of the present invention, for dissolving such problem, while setting the lower limit on the ON time for the PWM signal, the frequency of the PWM signal is so exchanged that the duty ratio of the PWM signal is set corresponding thereto, even when the DC brushless motor 12 rotates at the low revolution number, such as, in the starting operation thereof or in the operation under a light load.

Hereinafter, explanation will be given on the exchange of the frequency of the PWM signals in this first embodiment, however the minimum ON time of the driving signals U+, U−, V+, V− and W+, W−, which are outputted from the micro-computer 1, comes to be 13 $\mu$sec, by taking processing time of the micro-computer 1 into the consideration, as was mentioned in the above.

First, by referring to FIG. 5, explanation will be given on an operation from the time when the DC brushless motor 12 is started to rotate until the time when it is under a normal stable operating condition thereof.

Figure 5A:
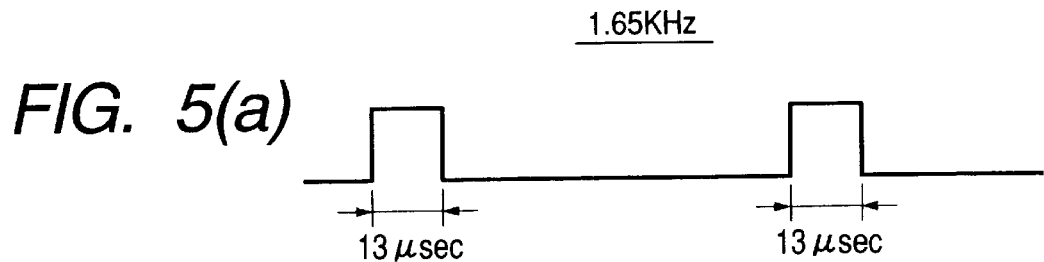
FIGS. 5(a) to (c) are views for showing exchange in the frequency of the PWM signal of the driving signals for the inverter, in the first embodiment shown in the FIG. 1.

Now, assuming that the frequency of the PWM signals of the driving signals U+, U−, V+, V− and W+, W− when the DC brushless motor 12 is in the normal stable operation is at 3.3 kHz, the micro-computer 1 sets the frequency of the PWM signal to be a half (½) of 3.3 kHz, i.e., at 1.65 kHz, as shown in FIG. 5(a), thereby setting the ON time of the PWM signal to be about 13 $\mu$sec. The duty ratio in this instance is smaller than that in a case where the frequency of the PWM signals when being driven in the normal stable operation is 3.3 kHz and the ON time is 13 $\mu$sec. Thereby, the DC brushless motor 12 is started in more smooth than when the frequency of the PWM signal is at 3.3 kHz and the ON time is 13 $\mu$sec.

Figure 5B:
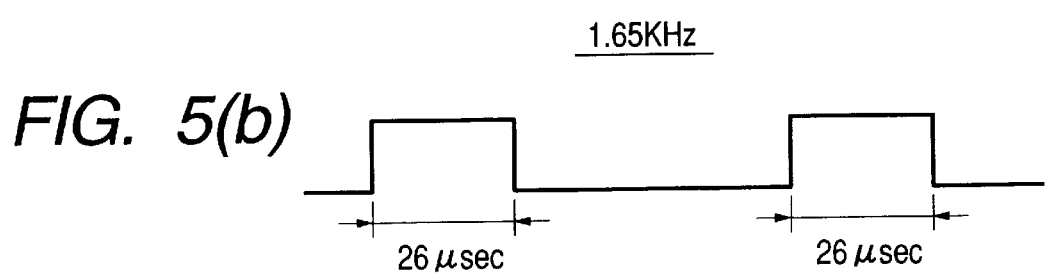
Figure 5C:
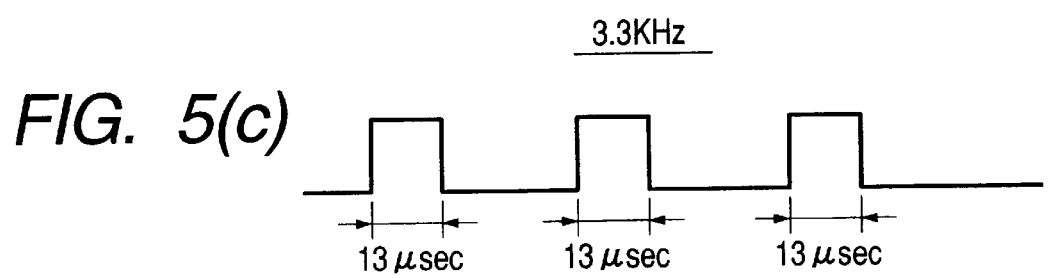

After this starting operation, the micro-computer 1 always watches this ON time of the produced PWM signals, and the duty ratio of the PWM signals is increased up accompanying with the increase of the revolution number of the DC brushless motor 12, while the ON time thereof comes to be longer, gradually. And, the micro-computer 1, as shown in FIG. 5(b), when detecting that the ON time of this PWM signal comes to be two (2) times long as the ON time when starting, namely when detecting that it is around 13×2=26 $\mu$sec, then it exchange the frequency of the PWM signals into 3.3 kHz being two times large as that, while keeping the duty ratio of the PWM signals at that time. Thereby, as shown in FIG. 5(c), the ON time at this instance comes to be around 13 $\mu$sec. After that, this PWM signals of 3.3 kHz becomes large in the duty ratio thereof, accompanying with the increase of the revolution number of the DC brushless motor 12, therefore the ON time becomes long.

In this manner, it is possible to maintain the minimum ON time for enabling to detect the level of the magnetic pole position detecting signals, correctly, as the ON time of the PWM signals, when the DC brushless motor 12 is started, and it is also possible to set the duty ratio to be sufficiently low. Also, it is same to the above even in the normal stable operation, and further it increase the frequency of the PWM signals up, therefore it is always possible for the DC brushless motor 12 to detect the level of the magnetic pole position detecting signals, correctly, from the starting thereof. Then, the detection on commutation timing comes to be certain, thereby enabling a stable control of revolution number thereof, and in the normal stable operation, the frequency of the PWM signals is increased up, thereby enabling a smooth rotation depending upon the load of the DC brushless motor 12.

Also, when the frequency of the PWM signals is changed from the condition shown in the FIG. 5(b) to that shown in the FIG. 5(c), there is no change in the duty ratio thereof, therefore an averaged value of the driving current, being supplied from the semiconductor switching elements 6a–6f of the inverter 11 into the DC brushless motor 12, does not change, accordingly, no abnormal rotation occurs in the DC brushless motor 12 when the frequency of the PWM signal is exchanged.

Further, when the operation comes under the light load condition, also the revolution number of the DC brushless motor 12 is decreased down, and accompanying therewith, the duty ratio of the PWM signals comes to be small, thereby shortening the ON time of the PWM signals. And, as shown in the FIG. 5(c), when the ON time of the PWM signals comes to be around 13 μsec and the revolution number is decreased down furthermore, the frequency of the PWM signals is reduced from 3.3 kHz down to 1.65 kHz while keeping the duty ratio at that time. Accordingly, the ON time of the PWM signals comes to be 26 μsec, thereby further enabling to reduce the revolution number of the DC brushless motor 12 until this On time comes to be 13 μsec. In this case, there can be obtained the effect being same to that mentioned in the above.

Next, explanation will be given on a second embodiment according to the present invention.

Figure 6:
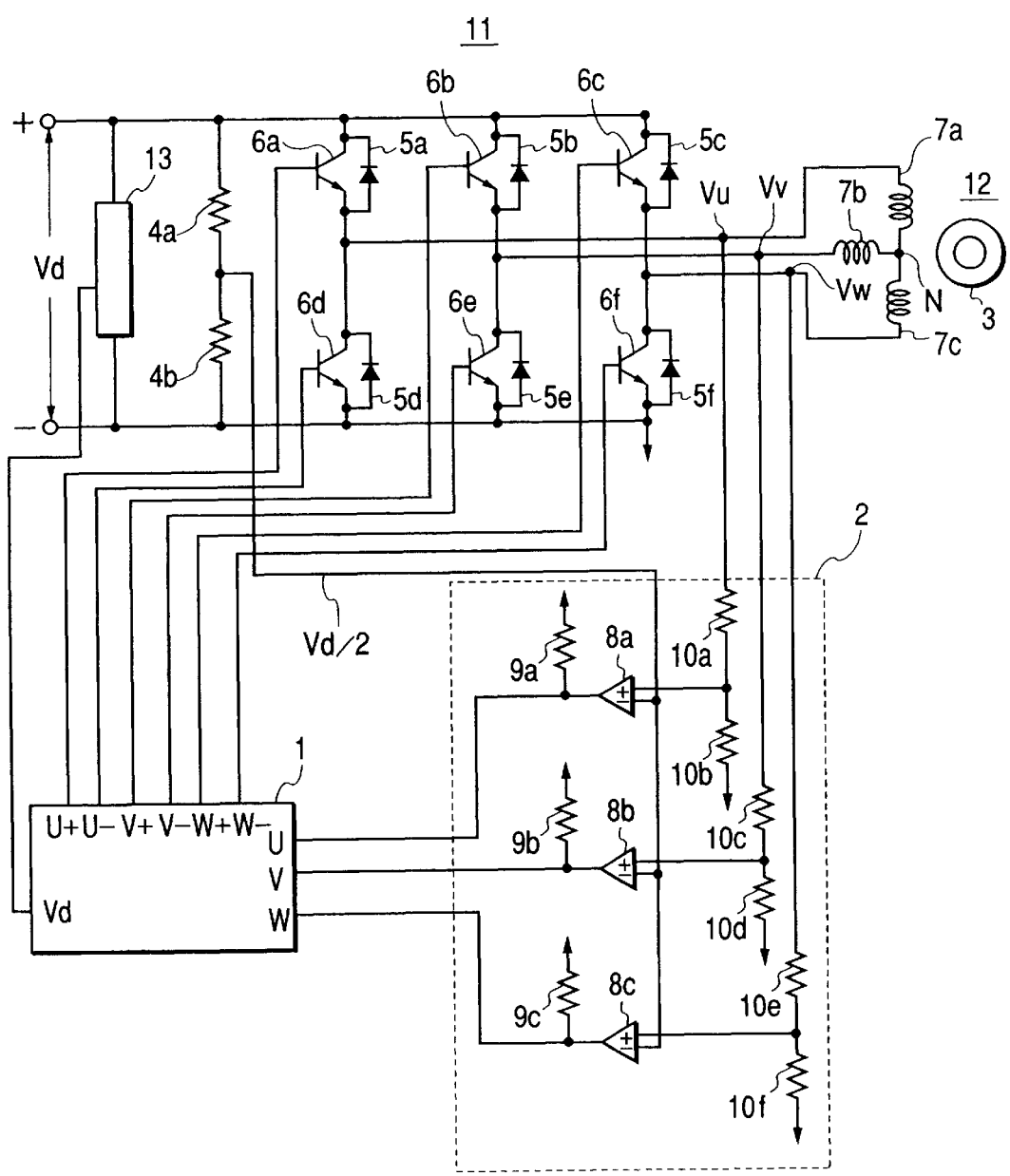
FIG. 6 is a circuit construction diagram for showing a second embodiment of the DC brushless motor driving apparatus and the air conditioner with using thereof, according to the preset invention.

FIG. 6 is a circuit diagram for showing a second embodiment of the DC bruchless motor driving apparatus and the air conditioner with using thereof, according to the present invention, wherein a reference numeral 13 indicates a DC voltage detector, and the elements corresponding to those shown in the FIG. 1 are attached with the same reference numerals, so as to omitted duplication of the explanation thereof.

In the air conditioner, it is general to use different commercial AC power sources, such as 100 V and 200 V, as the commercial AC power source therefor. Then, in this second embodiment, as shown in the FIG. 6, it is so constructed that the DC voltage detector 13 is added to the construction shown in the FIG. 1, wherein the DC power source voltage Vd of the inverter 11 is detected by this DC voltage detector 13, thereby to determine a kind of the commercial AC power source (for example, the commercial AC power source of 100 V or the commercial AC power source of 200 V) not shown in the figure, under which the micro-computer 1 is operated, upon the basis of the detection of an output thereof, and upon a result of this determination, the frequency of the PWM signals is made to be different depending upon when the DC brushless motor 12 is started and when it is operated under a light load condition. The construction and the operation other than that mentioned above are same to those of the first embodiment shown in the FIG. 1.

By the way, in a case where the commercial AC power source of high voltage, such as of 200 V, is used as the commercial AC power source thereof, the DC power source voltage Vd is produced by full-wave rectifying and smoothing of the AC voltage of the commercial AC power source, therefore the DC power source voltage comes to be nearly equal to $200 \times \sqrt{2} = 283$ V, being about two (2) times large as using the commercial AC power source of 100 V, therefore the current flows through the respective semiconductor switching elements 6a–6f of the inverter 11, being larger than that flowing when using or applying the commercial AC power source of 100 V. Then, even when using the commercial AC power source of 200V, if the lower limit of the ON time for the PWM signals of the driving signals U+, U−, V+, V− and W+, W− is set at 13 μsec, the current, being larger than that flowing when using the commercial AD power source of 100 V, flows when starting the DC brushless motor 12 and/or when operating it under the light load condition. Of course, the ON time of the PWM signal can be made small if removing this lower limit, however if so, there can occur a case where the levels of the magnetic pole position detecting signals U, V and W cannot be detected from such the PWM signals.

According to this second embodiment, for dissolving such the problem, while setting the lower limit of the ON time of the PWM signal as mentioned above, it is aimed to reduce the driving current flowing when starting the DC brushless motor 12 and/or when operating it under the light load condition, and it is achieved by the frequency of the PWM signals. Here, as an example thereof, it is assumed that the commercial AC power source is of either one of 100 V and 200 V.

Then, in the FIG. 6, when the power source switch not shown in the figure is turned ON, the DC voltage detector 13 detects the DC power source voltage Vd of the inverter 11, and from the detection output, the micro-computer 1 decides whether the commercial AC power source not shown in the figure is of 100 V or 200 V. Here, as was mentioned in the above, in the case where the commercial AC power source of 100 V is used or applied to, the DC power source voltage Vd is about 140 V, while it is about 280 V in the case where the commercial AC power source is of 200 V, therefore it is possible to decide which kind of the commercial AC power source is used or applied to, from the detection of the output of the DC voltage detector 13, by setting a level for decision to be 200 V, for example.

And, the micro-computer 1 sets the frequency of the PWM signals of the produced driving signals U+, U−, V+, V− and W+, W− for the inverter 11 at a predetermined frequency (here, it is set at 3.3 kHz, as was mentioned in the above) when it decides that the commercial AC power source used is that of 100 V from the detection output of the DC voltage detector 13, thereby starting the DC brushless motor 12. However, also in this instance, the minimum ON time of those PWM signals is set at a length, with which the level of the position detecting signals U, V and W can be detected with certainty, upon the basis of the driving signals U+, U−, V+, V− and W+, W− (here, it is set at 13 μsec, as was mentioned above).

Also, the micro-computer 1, when deciding that the commercial AC power source used or applied to is that of 200 V from the detection output of the DC voltage detector 13, sets the frequency of the PWM signals of the produced driving signals U+, U−, V+, V− and W+, W−, at 1.65 kHz, being equal a half (½) of the predetermined frequency (i.e., 3.3 kHz), thereby to start the DC brushless motor 12 therewith. Also, in this instance, the minimum ON time of those PWM signals is set at 13 μsec.

In this manner, by setting the frequency of the PWM signals when starting the DC brushless motor 12 at a half (½) of the predetermined frequency (=3.3 kHz) mentioned above, it is possible to reduce the driving current supplied to the DC brushless motor 12 when starting it, down to a half (½) thereof, comparing to the predetermined frequency in the construction, thereby enabling to prevent from failure of changing from a synchronized starting into an operation with detecting the position thereof, and prevent from sounds due to excessiveness in the start torque and the increase of vibration thereof.

After that, the revolution number of the DC brushless motor 12 is increased up, and accompanying therewith, the ON time of the PWM signals is also increased up, however when this ON time reaches to a predetermined value (26 μsec, for example, but it may be larger than that), the frequency of the PWM signals is exchanged into the predetermined frequency (=3.3 kHz) mentioned above while keeping the duty ratio at that time. Thereby, it is possible to obtain a drive of the DC brushless motor 12 with smooth rotation thereof.

The operation of setting up such the frequency, in the case where the commercial AC power source of 200 V is used or applyied to, is equal to that shown in the FIG. 5 for the previous first embodiment. Also, in the operation under the light load condition in the case of using the commercial AC voltage source of 200 V, the frequency of the PWM signals is made a half (½) of the predetermined frequency, in the same manner.

As is mentioned in the above, in this embodiment, it is possible to reduce the driving current when starting the DC brushless motor 12 under the condition where the commercial AC power source of the high voltage is used or applied to, and it is also possible to obtain the rotation of the DC brushless motor 12 with smoothness under the normal stable operation thereof.

In such the second embodiment, it is assumed that the commercial AC power source used or applied to is either one of 100 V and 200 V, however according to the present invention, not restricting only to this, but it is also same when using the kinds of the commercial AC power sources having different voltages more than three (3), and the frequencies of the PWM signals at the starting for each of them may be set at, depending upon the relationships of those commercial AC power sources. Further, for the purpose of detecting the levels of the position detecting signals U, V and W upon the driving signals U+, U−, V+, V− and W+, W−, with certainty, the minimum ON time of the PWM signals should not restricted only to 13 μsec mentioned above, but it may be set at any value arbitrarily, depending upon the processing time by the micro-computer 1.

Also, in the respective embodiments mentioned in the above, the frequency of the PWM signals is changeable in two steps, however it may be possible to be changeable in three steps or more. For example, in the case of being changed in two steps, if the frequency in the starting of the DC brushless motor 12 is set at 1.65 kHz and that it is at 3.3 kHz under the normal operation condition thereof, the minimum ON time of the PWM signals is set at 13 psec, and when the ON time of the PWM signals comes to be 20 μsec after the starting thereof, the frequency is changed to be about 2.56 kHz while maintaining the duty ratio by the construction. Thereby, the ON time of the PWM signals comes to be the minimum one, i.e. 13 μsec. After that, the revolution number of the DC brushless motor is increased up while setting the frequency of the PWM singals at 2.56 kHz by the construction, and when the ON time of the PWM signals comes to be about 16.8 psec, the frequency of the PWM signals is set at 3.3 kHz while maintaining the duty ration at that time. Thereby, the ON time of the PWM signals comes to be about 13 μsec.

Further, in the embodiments mentioned above, it is so constructed that the reference voltage Vd/2 of the rotor magnetic pole position detector circuit 2 is obtained from the detector resistors 4a and 4b, however in the place thereof, it may be possible to obtain it from the neutral point N of the stator windings 7a–7c of the DC brushless motor 12 by using a predetermined detector resistors.

As was mentioned in the above, according to the present invention, even in the starting and the operation under the light load condition of the DC brushless motor, by reducing the frequency of the PWM signals driving the inverter, it is possible to make the ON time of the PWM signals ensuring the time length for detecting the magnetic pole positions of the brushless motor with certainty upon the basis of said PWM signals, thereby enabling to detect the commutation timing with certainty, so as to obtain a stable control of the DC brushless motor.

Also, according to the present invention, even if the DC power source voltage of the inverter is different from, since it is possible to reduce the driving current when starting the DC brushless motor and/or operating it under the light load condition by a simple method, such as of reducing down the frequency of the PWM signals for driving the inverter, therefore it is possible to prevent from the failure in exchange from the synchronizing starting into the operation with detecting position due to the excessiveness in the starting torque, from the sounds due to the excessiveness in the starting torque, and from the increase of vibrations thereof, and further it is also possible to detect the commutation timing of the inverter with certainty, thereby enabling the stable control of the DC brushless motor, as well as the stable driving responding to a wide range of input power source voltage and a wide range of the load thereof.

Furthermore, according to the air conditioner according to the present invention, by decreasing down the frequency of the PWM signals when being started, it is possible to reduce the power source current and leakage current in the starting operation thereof, as well as to enable the stable driving, responding to the wide range of input power source voltage and the wide range of the load thereof.

What is claimed is:

1. A DC brushless motor driving apparatus, comprising: a driver portion for generating inverter driving signals; an inverter being connected with six semiconductor switching elements in a three phase bridge, and for producing motor driving signals to be supplied to the stator windings of the DC brushless motor by driving said semiconductor switching elements with said inverter driving signals; and a plurality of comparators, each for comparing a motor terminal voltage across each phase of the stator windings of said DC brushless motor to a reference voltage of a DC power source voltage of said inverter, wherein said inverter driving signals include a PWM signal which is used to control any one of said semiconductor switching elements of said inverter to chop the motor driving signals in each turn-on interval of said DC brushless motor, and said driver portion detects levels of position detecting signals which are outputted from said comparators upon basis of timings of said inverter driving signals, thereby setting commutation timings for exchanging the turn-on intervals of said DC brushless motor depending upon the detection result thereof, wherein, there is further provided means for making a frequency of said PWM signals variable.

2. A DC brushless motor driving apparatus, as defined in the claim 1, wherein said means for making the frequency of said PWM signals variable exchanges the frequency of said PWM signals when ON time of said PWM signals of said inverter driving signals comes to be equal to a predetermined time which is determined in advance.

3. A DC brushless motor driving apparatus, as defined in the claim 2, wherein said means for making the frequency of said PWM signals variable comprises:

a first means for detecting the DC power source voltage of said inverter; and a second means for exchanging the frequency of said PWM signals of said inverter driving signals depending upon a result of detection by said first means.

4. An air conditioner, wherein a DC brushless motor equipped with the DC brushless motor driving apparatus, as defined in any one of the claims 1 to 3, is applied as an electric motor for use in driving a compressor.

* * * * *